Sept. 29, 1936.  J. P. BURKE  2,055,742
APPARATUS FOR MAKING PLASTIC COMPOSITIONS
Filed April 6, 1934  2 Sheets-Sheet 1
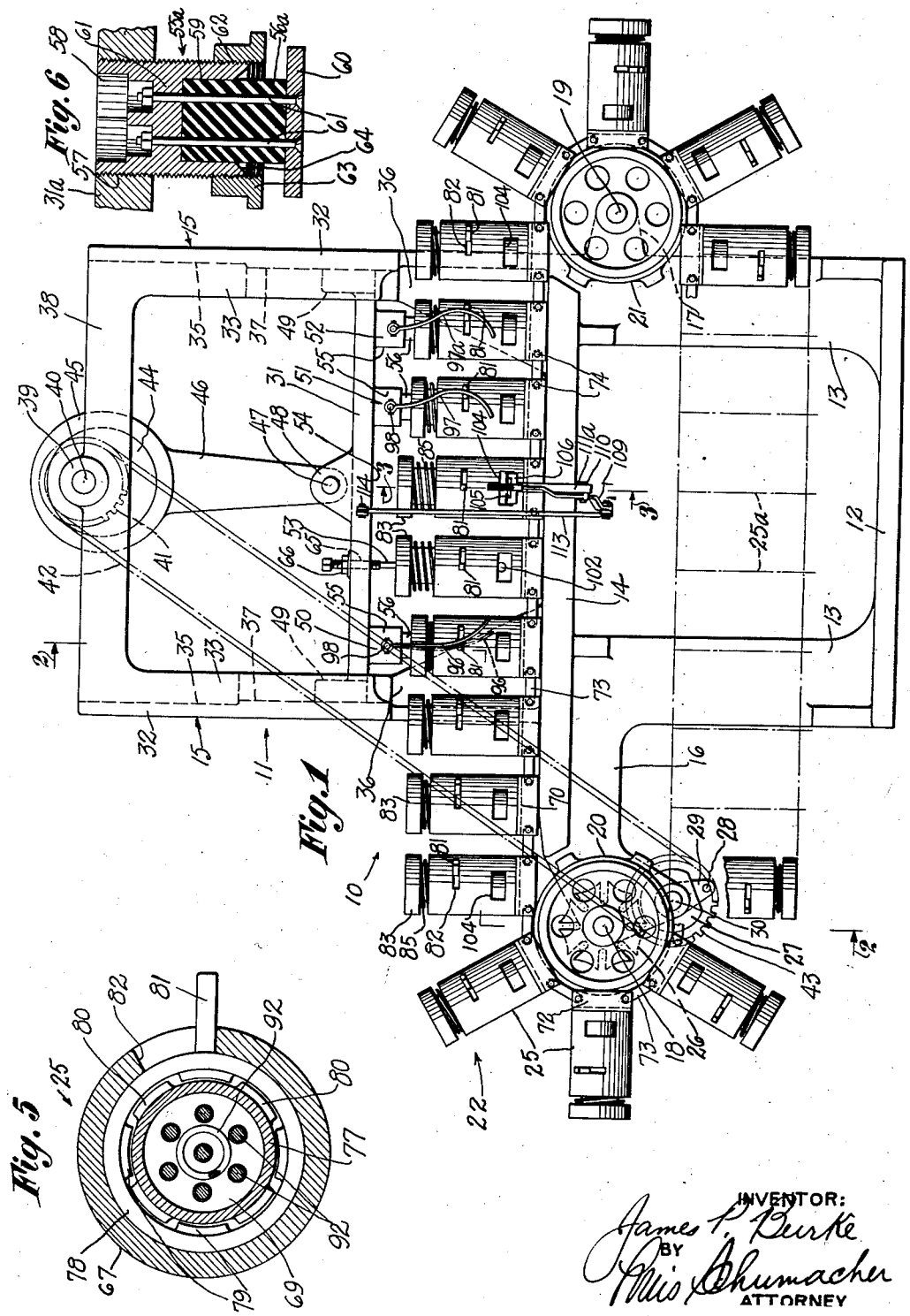
INVENTOR:
James P. Burke
BY
Otis Schumacher
ATTORNEY

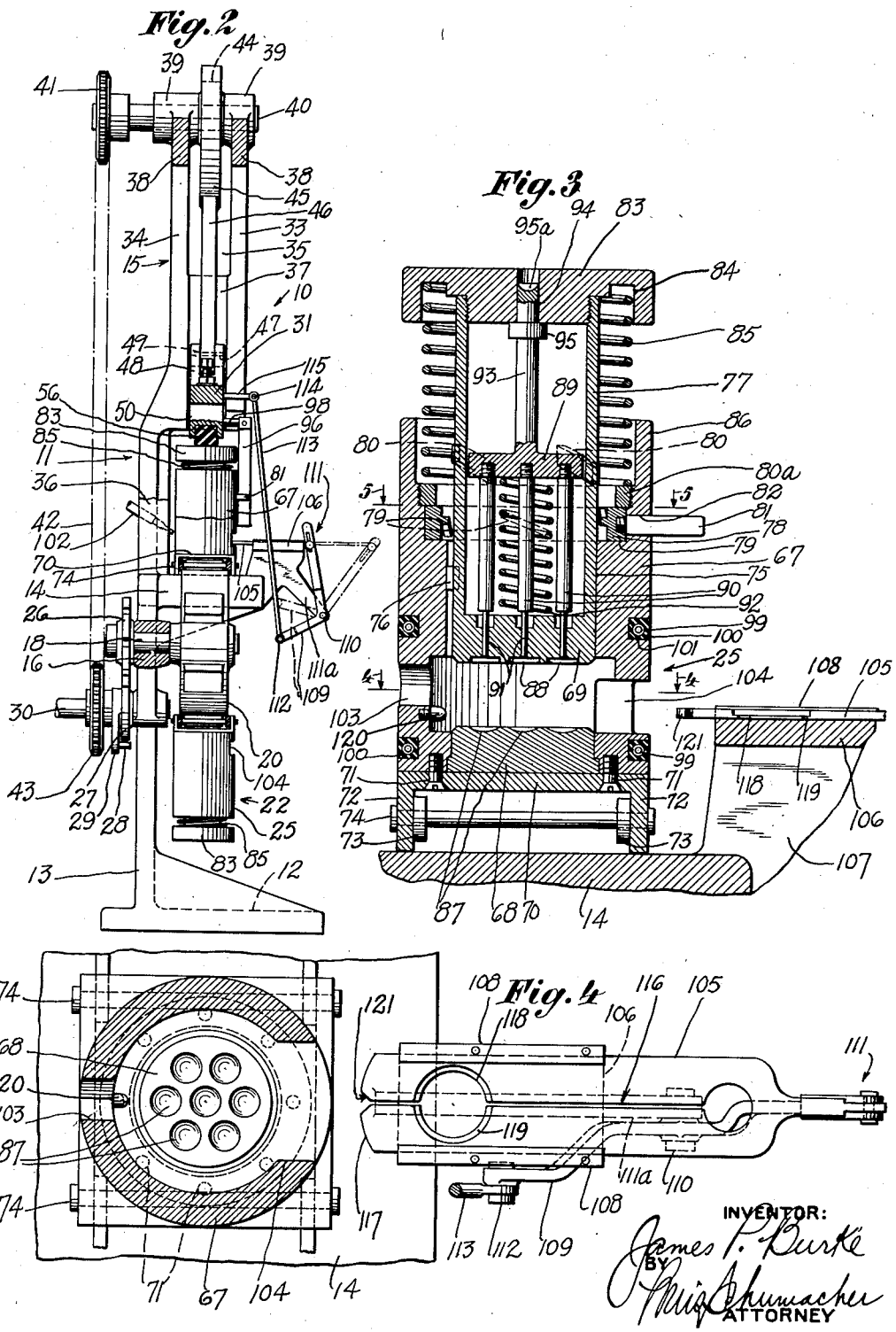

Patented Sept. 29, 1936

2,055,742

UNITED STATES PATENT OFFICE 2,055,742

APPARATUS FOR MAKING PLASTIC COMPOSITIONS

James P. Burke, Knoxville, Tenn., assignor to Auto-Mold, Inc., Knoxville, Tenn., a corporation of Delaware Application April 6, 1934, Serial No. 719,290

24 Claims. (Cl. 18—20)

This invention relates to devices and methods for molding articles.

One object of the invention is to provide apparatus for the continuous molding of articles, and desirably also for the automatic loading of the dies thereof and ejection of the molded articles from the dies, which apparatus is of improved simplified construction, and durable, reliable, and efficient to a high degree in use.

Another object of the invention, more specifically, is to directly compress or otherwise operate on a plurality of dies of the continuous apparatus in such manner as to avoid the use of inclined guides with resultant high friction and also to avoid the necessity of providing separate heads individually actuated for operating on the dies, the latter construction being rather complicated and expensive.

Another object of the invention is to furnish a device of the nature set forth wherein the several dies are individually locked and unlocked, or closed and opened, and so maintained for a predetermined period, substantially or wholly independently of the compressive force initially exerted on the dies, whereby a greatly simplified coordination and construction is afforded, and further to provide means for applying a cushioned compressive force to the dies.

A further object is to provide an improved locking means for a die; an improved ejecting means; an improved loading means; and an improved die assembly; including a novel superior coordination of the features mentioned.

The present application is a continuation in part and improvement upon my copending application, Serial No. 609,874, filed May 7, 1932, for an Apparatus for manufacturing articles from plastic composition material, which has become Patent 1,959,612.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Figure 1 is a view in side elevation of an apparatus embodying the invention, with certain parts schematically indicated in dot-dash lines.

Fig. 2 is a view in vertical section taken on line 2—2 of Fig. 1, with one member shown in a different position in dot-dash lines.

Fig. 3 is a fragmentary enlarged vertical sectional view taken on line 3—3 of Fig. 1.

Fig. 4 is a horizontal sectional view taken on line 4—4 of Fig. 3.

Fig. 5 is a horizontal sectional view taken on line 5—5 of Fig. 3, but with the die in closed position.

Fig. 6 is a fragmentary vertical sectional view of a modified compression portion of the common reciprocating pressure head.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, is submitted merely as showing the preferred exemplification of the invention.

Referring in detail to the drawings, 10 denotes a device embodying the invention. The same may include a frame 11 having a base plate 12, a pair of spaced standards 13 carrying a table 14, and a guideway 15 extending above the table. Extending endwise from the standards 13 are the bracket arms 16, 17 on which are journaled at 18, 19, the sprocket wheels 20, 21 respectively. Engaging around the sprocket wheels is an endless chain or series of traveling dies 22 including the individual dies 25 which may be exact duplicates of each other. The arrangement is such that the series of dies travel over and under the table 14, for a purpose hereinafter described, the dies above the table being normally upright and those beneath the table being uniformly inverted as shown and as indicated by the dot-dash center lines 25a for certain dies omitted from the drawings.

For driving the series of dies intermittently, a Geneva drive may be used, which may include a star shaped cam wheel 26 fixed on the shaft 18 and actuated by a companion cam and pin 27, 28, the latter being on an arm 29, and being fixed on a shaft 30 to rotate as a unit in fixed relation to each other. The shaft 30 may be rotated continuously and at uniform speed by any suitable source of power (not shown).

For operating on a plurality of dies 25 above the table 14, I provide a slide or power head 31 arranged to reciprocate along the guideway 15. The latter may include upright end portions 32 that are U-shaped in cross section thereby providing side flanges 33, 34 and webs 35, the latter and the webs being reenforcingly connected to the table by ribs 36 which are rearwardly offset so as not to obstruct the table. The portions 32 provide a slideway 37 therebetween for the slide 31. Interconnecting the flanges 33, 34 are the spaced bars 38 having alined hubs 39 in which is journaled a shaft 40 carrying a sprocket wheel 41 connected by a sprocket chain 42 with a corresponding wheel 43 fixed on the shaft 30. Secured to the shaft 40 is a cam or eccentric 44 on which is journaled a hub 45 of a connecting rod 46, pivotally connected at 47 with a yoke 48 formed on the slide 31. The latter may include a straight horizontal plate or bar and may have end enlargements or shoes 49 for slidingly engaging the guideways 37 and so as to maintain the member 31 in predetermined or horizontal position.

The slide or head 31 may extend along a plurality of the spaced dies and may be of sufficient length to simultaneously act on a plurality thereof. The slide may have different portions or elements for differently acting on the successive dies if desired. For example, the slide may have a plurality of successive pressure head portions 50, 51, 52 arranged to aline with different dies so as to compress the same in different degrees. For example, the head 52 may be longer than the head 51, and the head 50 may be longer than the head 52, causing correspondingly increasing pressures, for a purpose hereinafter described. Intermediate of the heads 50 and 51 there may be provided, first, an ejecting means 53 adapted to aline with a die, and then a free space at 54 to allow clearance for maximum opening of the die in this, the loading position.

Each of the heads 50, 51 and 52 may be the same in construction, and may be arranged to apply a gradual or static pressure on a die when the latter is in substantially fully closed compressing condition, and so as to avoid subjecting the die or the molding material to a shock. This is important because of possible irregularities in the construction of the machine, whereby breakage of a die might occur if a positive pressure were applied. Further, I obtain better distribution of a plastic molding material especially in a multi-cavity die by using the yielding pressure. Each head may include a separate or integral projection 55 having an opening into which is fitted a body of hard rubber 56 which is used to exert the compressive force on a die.

If desired, the heads 50, 51, 52 may be arranged as shown in Fig. 6 whereby an initial yielding force may be followed up by a positive pressure, and the heads may be individually adjustably mounted. Thus the slide 31a may have a head 55a that is threaded thereinto at 57, the head having an opening 58 for the head of a wrench so that the head can be screwed up or down. In the lower portion of said head is an opening 59 in which is fitted the hard rubber or yielding composition head 56a. The latter is desirably faced by a strong metallic plate 60, and screws 61 extending with a suitable clearance through the elements 56a and 60 and freely through a wall 61 retaining the parts in operative relation. Threaded on the head 55a at 62 a bushing 63 may be provided which may be adjusted to act as an abutment for the plate 60. An annular recess 64 may be provided in the head to receive the rubber when the same is deformed under pressure. It will be seen that by this construction the different heads 51, 52 and 53 may be easily adjusted relatively to each other and the slide 31, and that the resilient element of each head may take up the entire pressure, or that the pressure may be assumed to a greater or less degree by the abutment 63 according to the adjustment thereof, the initial pressure being in any case assumed by the resilient element. On compression, the screws are free to move upward into the opening 58.

The ejecting means or actuator 53 may be in the nature of a rod that may be threaded at 65 through the slide 31 and adjustably secured by a locknut 66.

Each die 25 may include a cylindrical element or guide 67 in which are mounted the die members 68, 69 of which the latter may be movable. The die member 68 may be set into the lower end of the element 67 and may rest on a channel member 70 that is secured to the element at 71. The side flanges 72 of the channel are adapted to rest on the table 14 and the flanges of successive dies are interconnected by links 73 to form a chain, the teeth of the sprockets 20, 21 being engageable between the pivot pins 74 of the links.

The movable die member 69 is slidably fitted in the passage 75 of the member 67 and is nonrotatably keyed thereto at 76. Extending upward from said die member is a tubular element or guide 77, around which extends a coaxial locking ring 78 set into an annular recess seat 79, and movably retained therein by a ring 80a threaded to the member 67. The ring 78 and the element 77 each have angularly spaced inclined cam segments 79, 80 respectively, so arranged that the segments 80 are adapted to pass between alternate segments 79 and to be interlocked therewith by a rotation of the ring 78. Angular movement of the latter may be caused by an arm 81 extending through a slot 82 in the casing 67 whereby the ring may be turned back and forth to lock and unlock. The upper end of the element 77 may have threaded thereto an abutment plate 83 having an annular recess 84 for seating an expansion coil spring 85, the lower end of which may seat on the ring 80a. The casing 67 may have a cylindrical skirt portion 86 for guiding the spring.

The die may have one or more cavities, for example, 7 in number as shown at 87 in the member 68, and the die member 69 may have corresponding alined cavities 88. When the die is closed, the cavities 87, 88 register with each other, whereby a plurality of articles may be molded in one operation in each die.

For ejecting the molded articles from a die, the tubular element 77 may have suitable means therein which may include a head 89 slidable along the element. The said head may have one or more parallel pins 90 connected thereto and having undercut portions 91 adapted to movably extend through passages in the die member 69 in central alinement with the cavities 88 thereof. An expansion coil spring 92 may act between the head 89 and the die member 69 so as to tend to elevate the ejector pins into the retracted position shown in Fig. 3. For actuation of the head 89, the latter may have a central bar 93 secured thereto and extending slidably upward into a passage 94, a shoulder 95 being provided on said bar whereby upward movement of the ejector under the action of the spring 92 is limited. The passage 94 is also adapted to receive the pin 53 for actuation of the bar 93 at the concaved end 95a of the latter so as to cause downward movement of the ejector means against the force of the spring 92, but without affecting the more powerful spring 85.

For actuating the arm 81, any suitable means operating synchronously with the travel of the dies may be provided. A simple arrangement consists in providing leaf springs 96, 97, and 97a, the former being secured to the pressure head 50, and the springs 97 and 97a to the different heads 51, 52. All of these springs may be alike and may be connected as by pins at 98, but the spring 96 may be curved in one direction so as to tend to throw the arm 81 into unlocking position, and the springs 97, 97a may both be curved in an opposite direction so as to reversely throw arms 81 into locking positions.

If the dies are used to mold plastic compositions, the casing 67 may be provided with externally accessible annular heating elements such as electrical resistance coils 99 surrounded by insulation 100 and set into recesses 101 in the casing wall. Current may be fed to the elements by any suitable means, not shown.

The cavities 88 are preferably arranged so that the molded articles tend to bind therein more strongly than in the cavities 87, whereby when the die member 69 is elevated, the articles are raised up out of the cavities 87. Then the ejecting pins operate and simultaneously the articles are suitably removed from the die as by a jet of air under pressure discharged by a nozzle 102 through an adjacent rear opening 103 in the wall of the casing 67, causing removal of the articles through a relatively large front opening 104 of the die casing 67.

For automatically loading the die, a loading means is provided which may include a slide 105 resting on a forward table extension 106 carried by a bracket 107 of said table at a higher elevation than the latter. The loading means is located in the position indicated at 54 in Fig. 1, and is adapted to enter a die through the opening 104 thereof. Desirably the slide 105 is adapted for reciprocation along a plane at an elevation somewhat higher than the die member 68 for a purpose hereinafter described, and may be movable between guide elements 108 secured to the extension 106. Reciprocation of the slide may be caused in any suitable manner synchronously with the travel of the dies, as by employing a linking connected to the member 31. For example, a bell crank lever 109 may be pivotally mounted at 110 on an arm 111a of the bracket 107, one arm of the lever having lost motion pivotal connection at 111 with the slide 105, and the other arm of said lever being pivotally connected at 112 to a rod 113 whose upper end may be pivotally connected at 114 with an extension 115 fixed on the member 31. It will be noted that while the member 31 is in its downward position, in which case the series of dies are stationary, the slide 105 is thus moved to extend into the die at position 54, as this die is fully open, sufficient clearance being available to permit the spring 85 to open the die as far as its expansibility will allow.

The slide or loader 105 may be expansible as by being longitudinally split at 116 up to the forward end 117 thereof, and having an opening 118 therethrough diametrically intersected by the split and provided with supporting means such as an annular shoulder or seat 119. Cooperating with the split 116, is a suitable means for spreading the same a sufficient extent to cause a disc or tablet of molding material that may rest on said shoulder 119 to be discharged through the opening 118 and onto the die member 68 in central relation thereto. For this purpose, the die casing 67 may have an abutment pin 120 fixed thereto in opposed relation to the slide 105 and so as to engage an entrance 121 to spread the split when the loader 105 is projected into the die. In this manner the spreading force is applied remotely from the closed end of the split and further aid in centering the loader element 105.

The operation of the machine will now be briefly described. The travel of the series of dies is intermittent and the power slide 31 reciprocates in synchronism therewith. While the dies are stationary, the power slide 31 moves into engagement therewith and applies compression thereto, and while the power slide is in upwardly retracted position, the dies advance one step according to the Geneva drive, the distance of the step being that from center to center of a pair of successive dies. The power slide acts simultaneously on a plurality or five of the dies as shown, while these dies rest on the table 14. This simultaneous action consists in exerting a compression at the subhead 50 for causing opening of the die, causing ejection as by pin 53 of the articles of a succeeding die, allowing ample clearance at 54 for the next succeeding die and also causing loading thereof, then causing compression of a succeeding die by the subhead 51, and of the next succeeding die by the subhead 52. Then each die advances one step so that the die opened at 50 comes into ejecting position at 53, and so on.

As the power slide 31 advances downward, the dies being stationary as aforesaid, the loader 105 which has received a pressed tablet of plastic molding material from any suitable source, is advanced by the linkage 109, 113 so as to engage the spreader 120, whereby the loader opening 118 is expanded to discharge the tablet in central relation in the coating die. As the power slide 31 moves upward, the loader 105 is retracted preferably rapidly, by any suitable mechanism, so as to clear the die when the latter begins its further travel. It will be understood that the die is in the position shown in Fig. 3 during loading, the cam elements 79, 80 being spaced out of locking relation with each other and being so maintained by the spring 85. Likewise the ejecting pins are held elevated by the spring 92.

The loading being completed, the die comes into position for engagement by the head or projection 51 of the power slide. The plate or piston 83 is first engaged and moved downward against the force of the spring 85 to close the die, with the die members being in tight contact, whereby the tablet is squeezed into the different cavities of the die. The ejecting pins are unaffected. As the die members approach contact, the resilience or cushioning of the portion 56 or 56a comes into operation, whereby a powerful pressure may be exerted, completing the distribution of the molding material in the die cavities and fully closing the die without subjecting the same to shock or cutting off the distribution of the molding material prematurely. With the descent of the power slide, the spring 97 moves into operative relation to the arm 81, and the cams 79, 80 are now in position to interengage. When the die is fully closed, the spring 97 has been sufficiently deformed by the arm 81 to exert a torque thereon sufficient to overcome the resistance or friction of the cam ring 78 so as to throw the same into locking position with the cams 80 being engaged below the cams 79. In this manner the die is locked closed and so remains after the power slide 31 recedes upward.

Upon the next intermittent motion, the die is in like manner acted on by the head 52 and the spring 97a. Specifically, the head 52 projects further than the head 51 so as to exert an increased pressure on the die for greater and final compression of the molding material. The frictional engagement between cams 79, 80 is released, and the spring 97a operative to further advance the cam ring so that the die members are more closely locked together, due to the inclination of the cams. It will be understood that the spring 97a may be differently deformed or positioned than the spring 97 whereby to act through a different angle. Thus the spring 97a may be advanced further to the left relatively to the die than the spring 97. If desired, one or both of the sets of cams 89, 89 may be sufficiently thick so that the cams of the different series may have end stop engagement with each other until the cams 80 pass below the cams 79 so that the cam ring may not be prematurely actuated by the spring. However, any suitable stop, frictional, or other timing means may be used, as might be preferred, it being regarded as sufficient herein to disclose the basic correlation of the parts, or a linkage may be employed to actuate the arms 81.

After final compression at 52, the die travels intermittently for a considerable time, during which the molding material is baked, until the die arrives in position for engagement at the head 50. Here the action is substantially the same as at the heads 51, 52, except that the spring 96 acts in a reverse direction for opening the locking mechanism of the die. In this position it is unimportant that any particular timing be employed for the cam ring 78, except that the die must be further compressed to relieve the pressure and hence the friction at the cams 79, 80 so that release may be easily accomplished, the angle of motion being limited by the slot 82 in which the arm 81 moves. Accordingly, the head 50 projects further than the head 52, so as to afford an increased pressure, which is resilient or cushioned so as not to break the die or subject the same to shock, and whereby, moreover, any fin formed on the molded article is accurately broken off without marring the article itself. As the power slide 31 recedes upward, the upper die 69 and its connected parts moves upward under the force of the spring 85 at a speed that is thus kept within limits, so that no lock or stop need be employed to prevent the spring from throwing the die upward with excessive force.

Now the die advances for engagement by the ejector actuator pin 53, which engages rod 93 and depresses the plate 89 and the ejector pins 90 against the force of the spring 92. The rear opening 103 of the die casing is now in registry with an air pressure nozzle 102 which throws the molded articles out through opening 104 into any suitable container and cleans the die members. Finally, when the power slide recedes, the ejector pins are returned to initial position and the die is advanced to loading position to repeat the cycle.

According to this invention a series of dies and a single or unitary power means are relatively movable toward or away from each other and intermittently past each other, with the power means acting differently but simultaneously on a plurality of the dies and in a successive manner. The individual locking means for the dies are not dependent for actuation upon the force of the power means, except as the latter places the locking means in condition to operate. In this manner a much cheaper and more durable and reliable apparatus is obtained. By a die having die members movable as a unit, or permanently associated as a unit, in open and closed position of the die, is meant a die in which the die members, whether permanently or releasably interconnected, are in substantial register with each other during the periods of the operation specified, or in which the die members are prevented from moving out of register with each other consistently with the automatic operation of the machine.

I claim:

1. A device including a series of traveling dies, each of said dies including a plurality of die members movable as a unit in open and closed positions of said dies, said dies having individual means for maintaining the die members in compressive interengagement, and a single reciprocatory means stationary relatively to the traveling dies for exerting compressive force in stages on a plurality of said dies simultaneously, and the travel of the dies being intermittent whereby the different dies are successively actuated by said single means.

2. In a molding apparatus, a series of traveling dies each comprising a plurality of die members permanently associated as units in open and closed positions of the dies, said dies having individual means for maintaining the same open or closed in compressing condition, and power means for simultaneously actuating a plurality of said dies to cause the same to open or close, as aforesaid, said dies and said power means being adapted for intermittent movement relative to each other, said power means including a unitary head carrying rigidly mounted elements thereon for individually actuating the dies.

3. An apparatus of the character described, including a series of dies each having a plurality of die members permanently associated as units in open and closed positions, and a single means having portions to cause opening and closing movements of one of the die members, and having another portion to cause release of a molded article from one of the die members, said portions being spaced along said means and the latter being movable toward and away from the dies to simultaneously operate on a plurality of said dies, the series of dies and the single power means being adapted for intermittent movement past each other corresponding with the movement toward and away from each other, whereby each of said portions operates successively on said dies.

4. An apparatus for molding plastic compositions including a series of dies each having a plurality of die members permanently associated as units in open and closed positions, each of the dies having individual means for locking the same closed and for automatically opening the same, a reciprocatory power means having relatively stationary elements for simultaneously acting on a plurality of the dies with said portions compressing the dies against the force of said automatic means, and means coacting with the power means to cause opening and closing of the different locking means in a down stroke of the power means so that one of the dies is closed and another opened during an upstroke of the power means.

5. An apparatus for molding articles, including a series of dies each having a plurality of die members, each of said dies having individual means for locking the same closed, each of the dies having resilient means for opening the same, and means for actuating the dies, said means including a single member movable toward and away from the dies to releasably exert a compressive force thereon, and said means including elements for opening and closing the locking means at different dies while said member exerts pressure on the latter, said means and said series of dies being intermittently relatively movable past each other.

6. A molding device of the character described, including a series of compressing dies each having a plurality of die members adapted for movement relative to each other to open and close the dies and being in permanently associated assembly relation in the open and closed positions of the dies, each of the dies having individual locking means for releasably maintaining the dies closed under pressure, each of the dies having ejecting means for the molded articles therein, a unitary power means for acting on the dies, said means and a plurality of said dies being relatively movable toward and away from each other, said means and said dies being adapted for intermittent relative movement past each other, said means having a first portion for exerting increased pressure on a locked die for reducing the tension on the locking means thereon, said means having a second spaced portion for exerting a pressure on an open die to compressively close the same, said means having a third portion intermediate of the first and second portions for actuating the ejecting means, and associated means coacting with the first and second portions to open and close the locking means, respectively.

7. A device including a series of dies each having a plurality of die members associated in permanent relation with each other in open and closed positions of the dies, power means, the latter and the dies being arranged for intermittent relative motion past each other, the power means and a plurality of the dies being relatively movable toward and away from each other for action of the power means on said dies, means to open one die including releasable locking means for the individual dies, and to lock a succeeding die, and the power means being so associated with the locking means as to tend to close the dies only, with different degrees of force, so that the friction on the locking means is reduced in the closed position thereof and the locking means in a position to close in the open position thereof.

8. A device including a series of dies each having a plurality of die members associated with each other in permanent assembly relation in open and closed positions of the dies, each of the dies having individual releasable rotary locking means coaxial therewith, the latter including a plurality of interengageable elements movable toward and away from each other in closed and open positions of the dies, reciprocatory means successively acting on the dies to exert a compressive force thereon to close the dies, including means for closing the locking means while the power means acts on the dies in the closed position thereof, the power means and the series of dies being intermittently movable relative to each other.

9. A device including a series of dies each having a plurality of die members, means permanently interconnecting the die members with the latter movable relatively to each other into open and closed positions, power means, the latter and the series of dies being intermittently relatively movable past each other, the power means and a die being relatively movable toward and away from each other, the dies having individual releasable locking means having operative and inoperative positions in closed and open positions respectively of the dies, the locking means being associated with said interconnecting means to lock a die closed, the power means being adapted to compressively close a die, and means to cause the locking means to close after the die is closed and while the die is so maintained by the power means.

10. A molding device of the character described, including a series of dies, the dies having individual releasable means for locking the dies closed, a single power head, the latter and the power head being movable toward and away from each other for exerting compression on the dies at intervals, the power head having portions disposed at different distances from the dies to exert different degrees of force on the different dies, so that one of the dies is compressively closed and another of said dies receives, in closed position, an increased force for squeezing and breaking a fin of the molded article in the die, and means for opening the locking means of the closed die and for closing the locking means of the open die, said series of dies and the power head being adapted for intermittent relative movement past each other whereby each of said portions acts on each one of the dies.

11. A device including a series of dies having die members associated as units in open and closed positions of the dies, said dies having individual locking means, each of said locking means having a portion movable through a small angle into opening and closing positions, a single power head larger than a die for exerting compressive force simultaneously on a plurality of the dies, said power head and said dies being relatively movable toward and away from each other and being intermittently relatively movable past each other.

12. A device including a series of dies having die members permanently associated with each other in the open and closed positions of the dies, a single power means, the latter and the dies being relatively movable toward and away from each other and intermittently past each other, the power means having different adjustable elements for exerting different compressive forces on the dies, and individual means for the dies to lock the same in compressed relation.

13. A die for molding plastic compositions including a plurality of die members, one of said die members having an ejecting element for an article molded in the die, said element being movable to project into the die, resilient means tending to move said element out of the die, a second resilient means tending to open the die, power means independent of the first mentioned resilient means and adapted to overcome the second resilient means so as to close the die to compress the contents thereof, and other means for actuating the ejecting element against the force of its resilient means, the second resilient means being superior in power to the first.

14. A device including a series of molding dies each having a plurality of die members movable toward and away from each other, and loading means for discharging tablets into the dies, said series and said loading means being adapted for intermittent travel relative to each other, the loading means being adapted to move into a die to discharge a tablet therein, said loading means having an opening and a seating shoulder therearound for the tablet, said opening being expansible, and means to expand said opening to cause the tablet to be discharged from the shoulder through said opening.

15. A device including a series of dies each having a plurality of die members movable toward and away from each other and permanently associated in assembly relation with each other in open and closed positions of the dies, power means for successively compressing the dies, said power means and the dies being relatively movable toward and away from each other and intermittently past each other, individual locking means for the dies coaxial therewith, including rotary elements for causing opening and closing of the locking means, all of said elements extending on only one side of the series of dies during the relative movements between the power means and the dies, and actuator means for said elements, said actuator means and said elements being relatively intermittently movable past each other.

16. A device including a die having a plurality of die members, a guide connected to one die member for movement of the other die member therealong, releasable cam locking means for the die interengaging the movable die member and the guide, independent reciprocatory means to cause the die to close, and means to close the locking means while the power means closes a die.

17. A device including a series of dies having die members permanently associated in coaxial relation with each other in open and closed positions of the dies, means coaxial with the dies for maintaining the die members in the coaxial relation, power means for exerting different compressive forces on different dies, said power means and said dies being relatively movable toward and away from each other and intermittently movable past each other, and individual releasable locking means for the dies adapted to lock the same in the compressed positions of the dies, said locking means interconnecting the first mentioned means and one of the die members and being remote from the other die member.

18. A device including a series of dies for plastic compositions each having a plurality of die members movable toward and away from each other, and power means, said power means and said dies being relatively intermittently movable past each other, said power means being adapted to compress said dies simultaneously and to exert successive increasing forces on each die according to the said intermittent movement, said power means including a resilient pressure head for exerting a substantially static gradually increasing pressure on each die for each relative position of the die and the power means.

19. A die for plastic compositions including a plurality of die members movable toward and away from each other, and means to exert a force on the die to close the same, said means including a resilient member for exerting a pressure on the die, and a rigidly movable member, the latter being adapted to actuate the resilient member and having a projecting portion for positively compressing the die after compression of the resilient member.

20. A die including a plurality of die members movable toward and away from each other, said members being nonrotatable relatively to each other, cam locking means for releasably locking the die members closed, including a cam ring angularly oscillatable for opening and closing the locking means, a tubular guide connected to one die member and within which the other die member is movable, said ring being journaled between the movable die member and the tubular guide and being adapted to interconnect the same to maintain the die closed.

21. A device including a series of dies each having a plurality of die members associated in permanent assembly relation with each other in open and closed positions of the dies, means for releasably interlocking the die members and to maintain the latter interlocked according to the increasing pressures on the dies, and a single power means, said power means and said series of dies being intermittently relatively movable past each other, said power means being movable to different positions, adjacent to and spaced from the dies, and having portions for engaging a plurality of the dies in the position of the power means adjacent to the dies, and said portions being so related to each other as to cause increasing compressive forces to be exerted on the dies successively.

22. A device including a movable series of dies each having die members releasably interlocked and movable relatively to each other to open and close the die, means for movably supporting the series of dies, the supporting means having stations therealong at which operations are performed for opening a die, stripping an article therefrom, ejecting the article, reloading the die, closing the die and compressing the same, and a power means reciprocable as a unit toward and away from the supporting means and extending over the different stations, said power means having different elements to cause a plurality of said operations at different stations of the supporting means, as set forth.

23. A device including a series of traveling dies, each having a plurality of die members movable toward and away from each other to open and close the die, each die member having a guide sleeve rigid therewith, the companion die member being directly guidably movable along and within said guide sleeve in the open and closed positions of the die, means for causing the travel of said series of dies, and automatic means for causing successive operations to be performed on the successive dies, including opening a die, stripping an article therefrom, and closing and compressing the die.

24. A device including a die having die members movable toward and away from each other to open and close the die, one die member carrying a guide means along which the other die member is movable, and means to releasably lock the die closed, the locking means being adapted for interconnecting the guide means and the movable member to prevent movement of the latter toward die opening position.

JAMES P. BURKE.